(12) United States Patent
Salesse et al.

(10) Patent No.: US 12,181,026 B2
(45) Date of Patent: Dec. 31, 2024

(54) ACTUATOR WITH VARIABLE MECHANICAL GAIN, AND ASSOCIATED METHOD

(71) Applicant: KENDRINOV S.A., Bulle (CH)

(72) Inventors: Christian Salesse, La Roche Près Feyt (FR); Jean-Marc Loriot, Paris (FR)

(73) Assignee: KENDRINOV S.A., Bulle (CH)

( * ) Notice: Subject to any disclaimer, the term of this patent is extended or adjusted under 35 U.S.C. 154(b) by 0 days.

(21) Appl. No.: 18/548,548

(22) PCT Filed: Feb. 23, 2022

(86) PCT No.: PCT/IB2022/051579
§ 371 (c)(1),
(2) Date: Aug. 31, 2023

(87) PCT Pub. No.: WO2022/185148
PCT Pub. Date: Sep. 9, 2022

(65) Prior Publication Data
US 2024/0159299 A1     May 16, 2024

(30) Foreign Application Priority Data
Mar. 3, 2021   (FR) ...................... 2102077

(51) Int. Cl.
*F16H 25/24*     (2006.01)
*F16H 25/22*     (2006.01)

(52) U.S. Cl.
CPC ......... *F16H 25/2247* (2013.01); *F16H 25/24* (2013.01); *F16H 2025/2271* (2013.01)

(58) Field of Classification Search
CPC .... F16H 25/125; F16H 53/06; F16H 25/2247; F16H 25/24; F16H 2025/2271
See application file for complete search history.

(56) References Cited

U.S. PATENT DOCUMENTS

| 3,298,659 A | 1/1967 | Janse |
| 6,024,422 A | 2/2000 | Drennen et al. |

(Continued)

FOREIGN PATENT DOCUMENTS

| EP | 1370388 B1 | 8/2007 |
| WO | 02076665 A1 | 10/2002 |

OTHER PUBLICATIONS

International Search Report for PCT/IB2022/051579 mailed Jun. 1, 2022, 3 pages.

(Continued)

*Primary Examiner* — Randell J Krug
(74) *Attorney, Agent, or Firm* — Nixon & Vanderhye P.C.

(57) ABSTRACT

An actuator for providing a thrust force over a determined travel, comprising a nut, a screw, a sleeve configured to surround the screw in an axial direction (X-X) of the screw, a plurality of rollers, the nut being configured to cooperate with the screw, the nut being secured to the rollers, which are free to rotate, the rollers being configured to each move in particular in the one of at least one helical guide or the sleeve, the screw being configured in order, when it is turned, to operate the actuator, to rotate the nut when it bears via the rollers on a profile of the helical guide and to thus advance in the axial direction (X-X) of the screw at greater or lesser speed along a slope of the profile of the helical guide. The actuator further comprises a motor configured to turn the screw. Successive values of the slope all along the profile or profiles of respectively the one or more helical guides ae adapted to ensure that the slope systematically compensates for at least one peak of the desired thrust force in order to carry out clipping of the maximum values of the thrust force such that the motor, the screw and the nut are dimensioned to a motor torque value corresponding to the value of the thrust force after clipping.

3 Claims, 4 Drawing Sheets

(56) References Cited

U.S. PATENT DOCUMENTS

| | | | |
|---|---|---|---|
| 7,098,419 B2* | 8/2006 | Salesse | F16H 25/20 |
| | | | 100/289 |
| 2017/0211671 A1* | 7/2017 | Nakayama | C23C 14/0611 |

OTHER PUBLICATIONS

Written Opinion of the ISA for PCT/IB2022/051579 mailed Jun. 1, 2022, 7 pages.
French Search Report for FR 2102077 dated Oct. 18, 2021, 2 pages.

* cited by examiner

Profil du guidage

Motor torque

ACTUATOR WITH VARIABLE MECHANICAL GAIN, AND ASSOCIATED METHOD

CROSS-REFERENCE TO RELATED APPLICATIONS

This application is the U.S. national phase of International Application No. PCT/IB2022/051579 filed Feb. 23, 2022 which designated the U.S. and claims priority to FR 2102077 filed Mar. 3, 2021, the entire contents of each of which are hereby incorporated by reference.

TECHNICAL FIELD

The invention concerns an actuator with variable mechanical gain and more particularly concerns a kinematic optimization method relating to the actuator with variable mechanical gain.

PRIOR ART

It is known from the European publication EP1370388B1 to procure a driving device for the relative movement of two members that is adapted to provide a variable kinematic ratio. The driving device can be controlled electrically by a numerical control system. Thus as depicted in FIG. 1 the driving device comprises:
- a screw 10 with given pitch P1 adapted to be driven in rotation about an axis in one direction or in another direction by a motor M,
- a nut 12 cooperating with the screw 10 and adapted to be driven in rotation in the direction of the axis of the screw 10, the nut 12 being constrained to move in translation with one of the two members,
- a bush 32 surrounding the screw 10 in the axial direction X-X of the screw 10,
- first guide means 34L in the bush 32 defining a linear guide parallel to the axis of the screw 10 to block rotation of the nut 12 in a first phase of movement of the nut 12,
- second guide means 34H defining a helical guide that extends along the axis of the screw 10 and which has the opposite pitch to the pitch of the screw 10 to enable rotation of the nut 12 in the same rotation direction as the screw 10 in a second phase of movement of the nut 12 in which, for example, the two members are closer to one another than in the first phase of movement, which enables reduction of the apparent pitch of the screw 10 and therefore the speed of movement in translation of the nut 12 in this second phase of movement.

The invention thus procures a driving device with variable kinematic ratio that consists of two distinct parts: a first part in which the nut 12 is prevented from rotating and a second part in which the nut 12 is driven in rotation in the same direction as the screw 10.

Thanks to the first part, the screw 10 provides a kinematic connection during a first phase that might be described as the inertial phase of the movement.

During this first phase the nut 12, which is free to move in translation, is guided in rotation by the first guide means 34L, which are fixed and parallel to the axis of the screw 10 and which therefore prevent the nut 12 from turning, whatever the direction of rotation of the screw 10 and that of the force to be transmitted. During this inertial phase, which enables movement closer together or farther apart of the two members (for example, closing or opening of a clamp), the screw will generally turn at an established constant speed. The speed of movement in translation (linear speed) of the nut 12 is therefore conditioned by the angular speed and the pitch of the screw 10.

During the second phase of movement the second guide means define a helical guide 34H that obliges the nut 12 to rotate in the same direction as the screw 10, which reduces the apparent pitch of the screw 10.

Consequently, assuming that the screw turns at the same angular speed as during the first phase of movement, the nut 12 will then be moved at a lower speed imposed by the apparent pitch. In effect, the nut 12 "freed" from linear guidance by the first guide means 34L will follow the pitch of the second guide means 34H.

During this second phase of movement the speed of movement in translation of the nut 12 decreases until it possibly becomes zero. There is therefore an apparent variation of the pitch until a zero value of the latter is obtained, if necessary.

In the prior art device the peaks of the variations in the desired thrust force have maximum values that impose the definition of the device, requiring a value of the motor torque enabling the maximum values of the cycle to be reached.

Technical Problem

The invention aims to optimize the kinematics defined in the prior art actuator device with variable mechanical gain described hereinabove.

SUMMARY OF THE INVENTION

In a first aspect the invention provides an actuator for producing a thrust force over a particular travel, comprising a nut, a screw, a bush configured to surround the screw in an axial direction (X-X) of the screw, a plurality of rollers, the nut being configured to cooperate with the screw, the nut being fastened to the rollers, free to rotate, each roller being configured to move in particular in one of at least one helical guide of the bush, the screw being configured so that when it is turned it causes the actuator to function to drive the nut in rotation when it bears via the rollers on a profile of the helical guide and therefore to advance in the axial direction (X-X) of the screw more or less quickly depending on the slope of the profile of the helical guide. The actuator further comprises a motor configured to turn the screw. Successive values of the slope all along the profile or profiles of one or more respective helical guides are such that the slope systematically compensates at least one peak of the desired thrust force in order to clip maximum values of the thrust force so that the motor, the screw and the nut are sized for a motor torque value corresponding to the value of the thrust force after clipping.

In a preferred embodiment the slope all along the profile of the helical guide is at each point inversely proportional to the force to be supplied at each of the respective points, thus configuring the actuator so that a motor torque to be applied to the screw to obtain the force intended to be supplied is constant and equal to a mean value which in movement provides the energy necessary to carry out the movement operation.

In another preferred embodiment the slope all along the profile of the helical guide is configured to follow a hyperbolic law which, by therefore configuring the actuator so that applying a constant torque to the screw, produces a force applied by the actuator that increases linearly from 0 to its maximum value.

In another preferred embodiment the actuator includes a helical guide or a plurality thereof and one or more rectilinear guides, each helical guide having its own variable slope profile, the number and the distribution of the one or more helical guides of the actuator and the profile of each individual helical guide being determined as a function of the position and the value of various loads along the travel of the actuator.

In accordance with a second aspect the invention provides a method of optimization of at least one slope of the profile of a helical guide in an actuator as described hereinabove, comprising definition of a function F(y) of a force F to be supplied by the actuator as a function of the travel y travelled by the actuator; determination of the slope Py of the helical guide at each position y as being inversely proportional to the force F(y) at that position y for a constant torque C of the motor (M) in accordance with the formula Py=C/F(y), and determination of a predetermined energy value $E_\omega$ in Joules to be supplied over one rotation of the nut by ω radians as being linked to the constant torque C in Newton meters in accordance with formula C=$E_\omega$/ω.

BRIEF DESCRIPTION OF THE DRAWINGS

The invention will be better understood from the following detailed description of embodiments of the invention given with reference to the figures, in which.

The same references may be used to designate the same elements or similar elements that appear in more than one figure.

DETAILED DESCRIPTION

Figure 1:
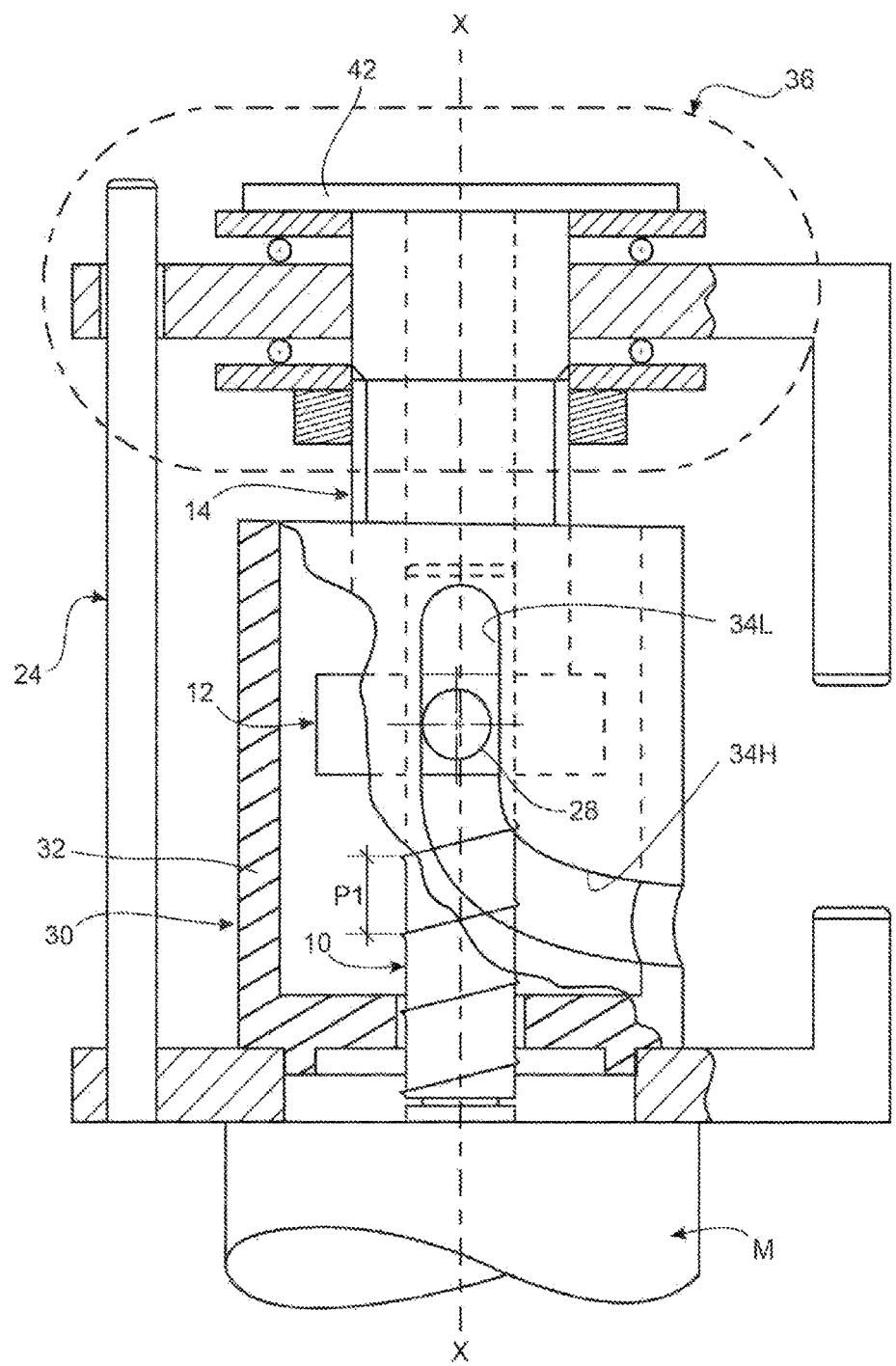
FIG. 1 depicts a prior art actuator device with variable mechanical gain.

The kinematics defined in the actuator device with variable mechanical gain described in the publication EP1370388B1 are optimized by variation of the mechanical gain of the kinematic, which corresponds to adding an additional adjustment parameter compared to the prior art device. FIG. 1 repeats basic elements known from the aforementioned patent EP1370388B1.

A motor M actuates directly a recirculating ball screw 10 in a first member 30. The recirculating ball screw 10 must have a very good inverse yield. A nut 12 collaborates with the recirculating ball screw 10, that nut 12 being fastened to a first piece 14 that transmits the thrust to a sub-assembly 36 that is in fact a second member that delivers an output thrust. Thrust ball bearings and a guide 24 guide a second part 42 of the second member that produces an output thrust force over a particular travel (the particular travel is not depicted in FIG. 1). The nut 12 also carries a plurality of rollers 28 that are fastened to it but free to rotate. Each roller 28 rolls in a guide that may have a rectilinear part 34L and that has a helical part 34H the pitch of which is reversed relative to that of the recirculating ball screw 10. It is the helical part 34H of the guides that generates almost all of the force for which the device was designed, the rectilinear part 34L essentially producing the closer movement.

The pitch of the screw 10 is large so that its inverse yield is good and an axial force applied to the nut 12 is sufficient to drive rotation of the nut 12 on the screw 10. In the following analysis this makes it possible to consider that the axial force generated by the screw 10 is negligible compared to the axial force produced by the rollers 28 when those rollers 28 are in the helical guides 34H. When the rollers 28 are in the helical guides 34H the rotation of the nut 12 relative to the screw 10 enables movement of the nut 12 to cause it to follow the profile of the guide 34H.

The present invention implies an analysis of the slope all along the profile of the helical part 34H of the guides in order to adapt the variations of the slope all along those guides to the force to be produced and thus to optimize the kinematic and the drive system to render the kinematic drive assembly of the actuator device with variable mechanical gain as small as possible, as light as possible, as performing as possible and of the lowest possible cost.

The objective of adapting the successive values of the slope all along the profile of the guides (34H) one at a time is for the guides (34H) systematically to compensate the peaks of the desired thrust force in order to produce true clipping of the maximum values of the motor torque so that, in contrast to the prior art device, it is not these peak values that impose the definition thereof. This maximum motor torque value will therefore be systematically lower than that established with a normal kinematic corresponding to the peak values of the cycle.

The kinematic drive assembly defined in this way will therefore be lighter, smaller and therefore less costly than the prior art system, and the motor will include fewer magnets (rare earths—samarium cobalt). Moreover, the lower inertial level of the kinematic drive assembly will confer on that assembly a much higher level of performance, in particular in respect of bandwidth.

If the motor produces a constant torque, the latter will have the mean value corresponding to the transfer during the cycle of the energy necessary to produce the expected function and therefore correspond to the minimum possible value of said motor torque.

As a general rule, if the motor produces a constant torque, there should be localized variations of the slope of the guides inversely proportional to those of the force to be delivered.

Thus if the force to be delivered is proportional to the travel, the slope of the guides 34H will follow a hyperbolic law in order for the product of the force by the slope to remain constant.

Thus the invention aims to optimize the profile of the guides 34H, and this variation of the successive values of the slope all along the profile of these guides, and therefore of the mechanical gain of the kinematic system, corresponds to a real additional adjustment parameter compared to the prior art device. It is this specific feature that makes it possible to provide the expected function with a motor and kinematic lighter, less costly and better performing than what can be achieved using the prior art system.

The same actuator may include no, one or a plurality of rectilinear sectors or rectilinear guides 34L and one or more variable slope sectors or helical guides 34H, each variable slope sector 34H being able to have its own individual profile. The number and the distribution of said rectilinear sectors 34L and variable slope sectors 34H of said actuator and the individual profile of each of the variable slope sectors 34H are determined as a function of the position and the value of the various loads along the travel of the load to be driven.

Figure 2:
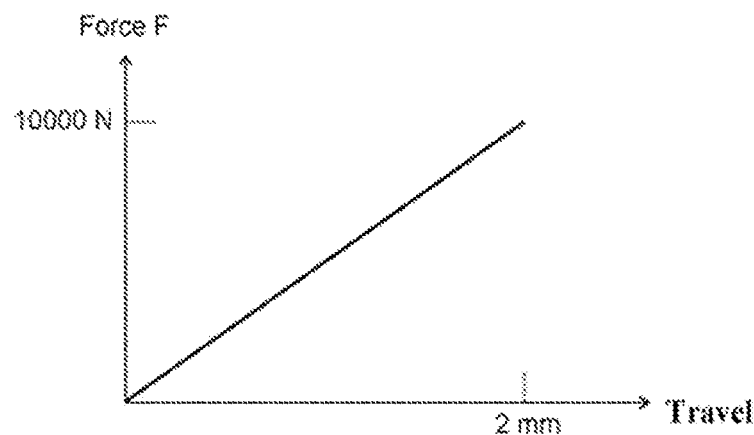
FIG. 2 contains a graph showing a force F that varies linearly from 0 to 10,000 N over a travel of 2 mm in accordance with one example of the invention.

FIG. 2, provided by way of example, shows a force F that various linearly from 0 to 10,000 N over a travel of 2 mm.

In this example the force is given by the mathematical formula:

$$F = K \times Y \text{ where}$$

F is the force in Newtons;
K is the coefficient of the function in Newtons per meter—in the example 5 $10^6$ Newtons per meter;
Y is the travel in meters—in the example 0.002 m; and
x is the sign signifying "multiplied by".
In accordance with the invention the slope of the guide at a given point is inversely proportional to the force at that point and the mathematical formula is $$Py = C/Fy \text{ where}$$

Py is the slope of the guide at the position Y in meters per radian;
C is the motor torque in Newton meters;
Fy is the force at the position Y in Newtons; and
/ is the sign signifying "divided by".
The energy W is the integral of the function 5 $10^6 *Y$, Y varying from 0 to 0.002 m, i.e. 5 $10^6 * (0.002)^2/2 = 10$ Joules.

To obtain an energy value of 10 Joules over a rotation of 2.5 radians at constant torque that constant torque must be 10 Joules/2.5 radians=4 Newton meters.

With this 4 Newton meters value of the torque the slope of the guide may be calculated at any point. For example at the following points:
at the position Y=1 mm (mid-travel) the force is 5000 N and the slope of the guide is therefore equal to 4/5000=0.0008 m/radian;
at the position Y=2 mm (end of travel) the force is 10,000 N and the slope of the guide is therefore equal to 4/10,000=0.0004 m/radian.

Figure 3:
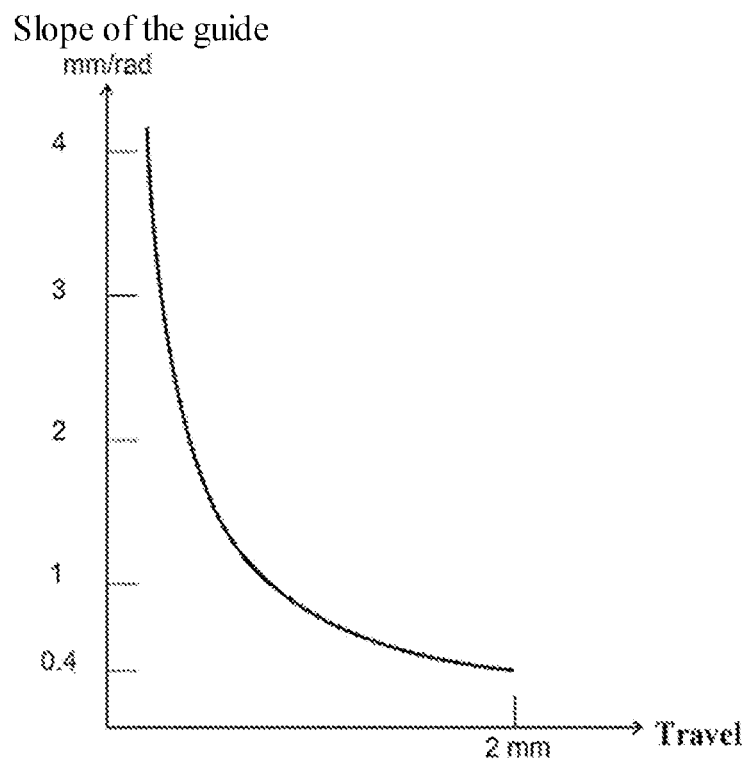
FIG. 3 contains a graph depicting the slope of the guide in an actuator device with mechanical gain as a function of the travel in accordance with one example of the invention.

FIG. 3 represents the slope of the guide as a function of the travel.

The start of the travel when the slope of the guide is greater than 4 mm/radian is not represented. In effect, for very low values of the force F the slope of the curve theoretically becomes very high. But in practise and in the context of the prior art device the guide profile becomes rectilinear and parallel to the screw and when the guides are rectilinear it is the screw that produces the movement of the load. With a screw slope of 4 mm/radian the force supported and supplied by the screw is 4 Nm/0.004=1000 N, i.e. $\frac{1}{10}^{th}$ of the maximum force.

Figure 4:
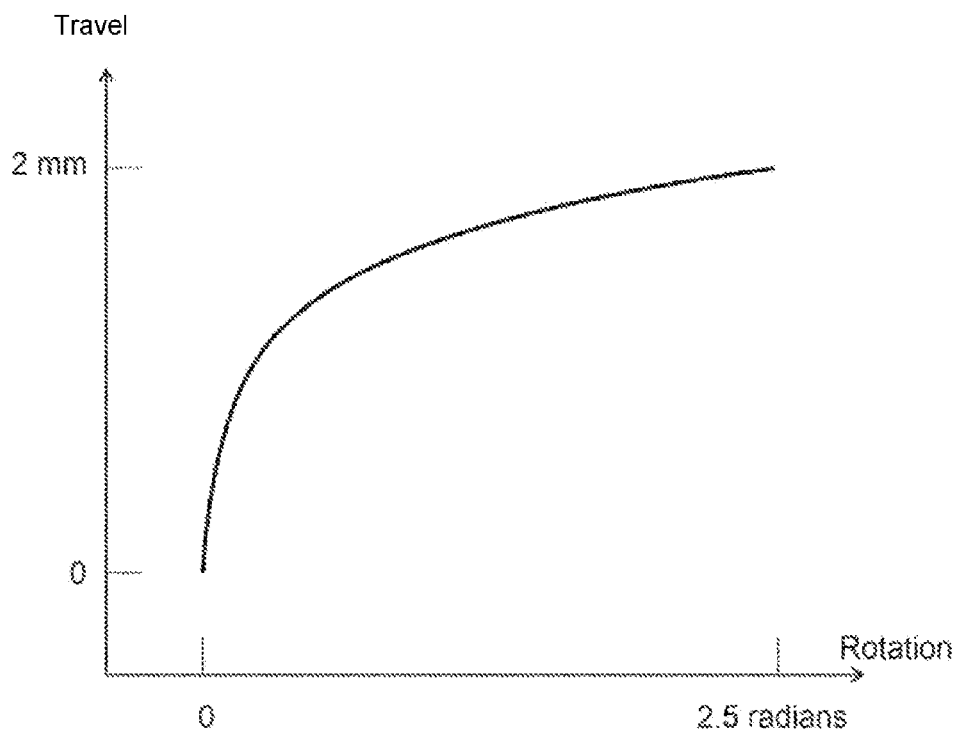
FIG. 4 contains a graph depicting the guide profile obtained by applying the calculation of the slope from FIG. 3 to a rotation of 2.5 radians.

FIG. 4 represents the guide profile obtained by applying the slope calculation from FIG. 3 to a rotation of 2.5 radians. The point 0,0 is offset from the axes for greater clarity.

The guide profile represented allows a constant torque of 4 Nm and, by causing the rollers to turn in the guide by 2.5 radians, a force to be applied increasing from 0 to 10,000 N over a travel of 2 mm.

Figure 5:
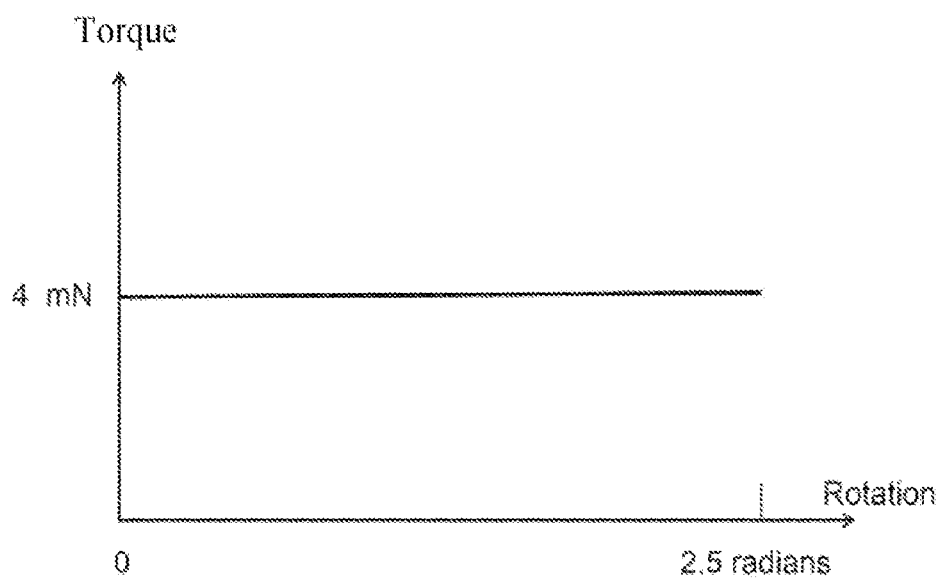
FIG. 5 contains a graph depicting a constant motor torque as a function of an angle.

FIG. 5 represents the motor torque that is constant.

Other examples could be given, like a force varying sinusoidally. This is the case of an aircraft flap or a vertical control surface that turns about an axis perpendicular to the flow of air; the axis of a flap is horizontal and the axis of a vertical control surface is vertical. The master torque of a flap or vertical control surface (the surface exposed to the flow of air) varies sinusoidally as the angular position of the flap or vertical control surface increases. The force exerted by the airflow is proportional to the master torque and therefore varies sinusoidally with the angle. To cause the flap or vertical control surface to turn a linear actuator acts at a point situated at a certain distance from the rotation axis. The force that the actuator must exert is sinusoidal and it will be very beneficial to apply the present invention. In all cases, the slope of the guide at each point is calculated by dividing the motor torque by the force at this point; the motor may be sized according to the mean value.

Figure 6:
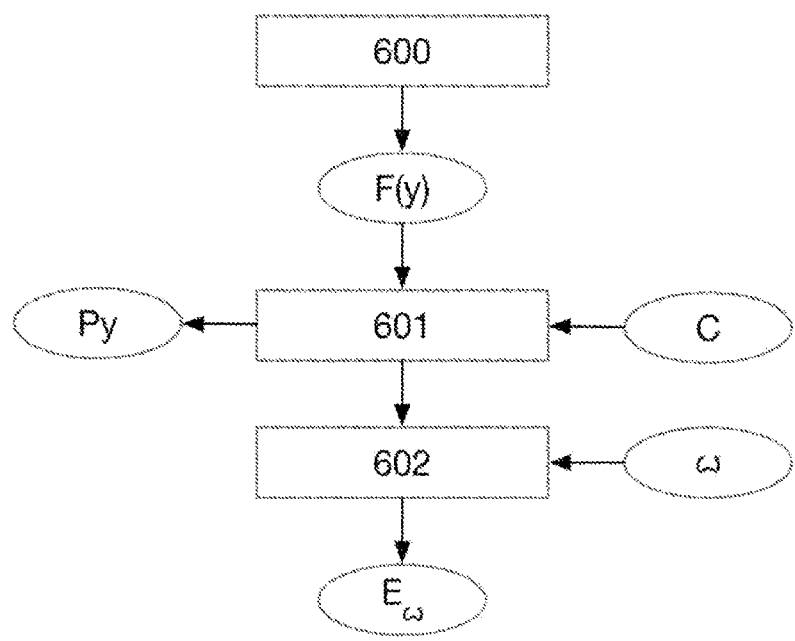
FIG. 6 contains a flowchart to depict a method of optimization of at least one slope of the profile of a helical guide in an actuator.

FIG. 6 contains a flowchart to illustrate the method of optimizing at least one slope of the profile of a helical guide in an actuator as described hereinabove. The method comprises the following steps:
definition 600 of a function F(y) of a force F to be supplied by the actuator as a function of the travel y travelled by the actuator
determination 601 of the slope Py of the helical guide at each position y as being inversely proportional to the force F(y) at that position y for a constant torque C of the motor (M) in accordance with the formula Py=C/F(y)
determination 602 of a predetermined energy value $E_\omega$ in Joules to be supplied over one rotation of the nut 12 by ω radians as being linked to the constant torque C in Newton meters in accordance with formula $C = E_\omega / \omega$.

The invention claimed is:
1. An actuator for producing a thrust force over a particular travel, comprising:
a nut,
a screw,
a bush configured to surround the screw in an axial direction (X-X) of the screw,
a plurality of rollers,
the nut configured to cooperate with the screw, the nut fastened to the rollers, free to rotate, and each roller configured to move in one of at least one helical guide of the bush,
the screw configured so that when the screw is turned the screw causes the actuator to function to drive the nut in rotation when the nut bears via the rollers on a profile of the helical guide and therefore to advance in the axial direction (X-X) of the screw more or less quickly depending on the slope of the profile of the helical guide,
the actuator further comprising
a motor configured to turn the screw,
wherein the profile of the at least one helical guide follows a hyperbolic law.
2. The actuator as claimed in claim 1 in which
the slope all along the profile of the helical guide is at each point inversely proportional to a force to be supplied at each of the respective points.
3. The actuator as claimed in claim 1 in which
the actuator includes the helical guide or a plurality thereof and one or more rectilinear guides, each helical guide having its own variable slope profile, the number and the distribution of the one or more rectilinear guides and the number and the distribution of the one or more helical guides of the actuator and the profile of each individual helical guide being determined as a function of the position and the value of various loads along the travel of the actuator.

* * * * *